United States Patent
Lin

(10) Patent No.: US 12,248,647 B2
(45) Date of Patent: Mar. 11, 2025

(54) TOUCH PANEL AND ELECTRONIC DEVICE

(71) Applicant: E Ink Holdings Inc., Hsinchu (TW)

(72) Inventor: Chun-Fu Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/504,153

(22) Filed: Nov. 8, 2023

(65) Prior Publication Data
US 2024/0241605 A1    Jul. 18, 2024

(30) Foreign Application Priority Data
Jan. 17, 2023   (TW) .................................. 112101942

(51) Int. Cl.
*G06F 3/041*    (2006.01)

(52) U.S. Cl.
CPC .................. *G06F 3/04182* (2019.05)

(58) Field of Classification Search
CPC ............... G06F 3/0446; G06F 3/04182; G06F 2203/04105
See application file for complete search history.

(56) References Cited

U.S. PATENT DOCUMENTS

| | | | |
|---|---|---|---|
| 11,307,699 B2 | 4/2022 | Kim et al. | |
| 2011/0139516 A1 | 6/2011 | Nirmal et al. | |
| 2012/0081320 A1* | 4/2012 | Hwang | G06F 3/0445 345/173 |
| 2013/0155024 A1* | 6/2013 | Chung | G06F 3/0412 345/175 |
| 2016/0306492 A1* | 10/2016 | Togashi | G06F 3/04186 |
| 2017/0090627 A1* | 3/2017 | Kim | G06F 3/0445 |
| 2019/0102030 A1* | 4/2019 | Kakinoki | G06F 3/0446 |

FOREIGN PATENT DOCUMENTS

| | | |
|---|---|---|
| CN | 107209590 | 10/2021 |
| CN | 114327132 | 4/2022 |
| TW | 1570603 | 2/2017 |

OTHER PUBLICATIONS

"Notice of Allowance of Taiwan Counterpart Application", issued on Feb. 21, 2024, p. 1-p. 3.

* cited by examiner

*Primary Examiner* — Abbas I Abdulselam
(74) *Attorney, Agent, or Firm* — JCIPRNET

(57) ABSTRACT

A touch panel includes a substrate, a plurality of control signal lines, a plurality of first reading signal lines, and a plurality of second reading signal lines. The plurality of control signal lines are disposed on a first surface of the substrate and spaced from each other. The plurality of first reading signal lines are disposed on a second surface of the substrate and spaced from each other. The second surface is opposite to the first surface. The plurality of second reading signal lines are disposed on the first surface of the substrate. Each of the plurality of second reading signal lines is located between adjacent two of the plurality of control signal lines. An electronic device including the above touch panel is also provided.

11 Claims, 2 Drawing Sheets

TOUCH PANEL AND ELECTRONIC DEVICE

CROSS-REFERENCE TO RELATED APPLICATION

This application claims the priority benefit of Taiwanese application no. 112101942, filed on Jan. 17, 2023. The entirety of the above-mentioned patent application is hereby incorporated by reference herein and made a part of this specification.

BACKGROUND

Technical Field

The disclosure relates to an electronic product. In particular, the disclosure relates to a touch panel and an electronic device.

Description of Related Art

Touch technology and display technology have been widely used in various electronic products on the market. The integration of touch technology and display technology has constantly been updated and developed. In particular, the design that directly provides touch functions corresponding to a display screen is a focus in development of many products. Under such a design, interference between display signals and touch signals is to be overcome.

SUMMARY

The disclosure provides a touch panel that helps suppress noise to improve touch correctness.

The disclosure provides an electronic device, in which a display panel is used with a touch panel with proper touch correctness to achieve display and also touch functions.

According to an embodiment of the disclosure, a touch panel includes a substrate, a plurality of control signal lines, a plurality of first reading signal lines, and a plurality of second reading signal lines. The plurality of control signal lines are disposed on a first surface of the substrate and spaced from each other. The plurality of first reading signal lines are disposed on a second surface of the substrate and spaced from each other. The second surface is opposite to the first surface. The plurality of second reading signal lines are disposed on the first surface of the substrate. Each of the plurality of second reading signal lines is located between adjacent two of the plurality of control signal lines.

According to an embodiment of the disclosure, an electronic device includes a touch panel and a display panel. The display panel is disposed on one side of the touch panel. The touch panel includes a substrate, a plurality of control signal lines, a plurality of first reading signal lines, and a plurality of second reading signal lines. The plurality of control signal lines are disposed on a first surface of the substrate and spaced from each other. The plurality of first reading signal lines are disposed on a second surface of the substrate and spaced from each other. The second surface is opposite to the first surface. The plurality of second reading signal lines are disposed on the first surface of the substrate. Each of the plurality of second reading signal lines is located between adjacent two of the plurality of control signal lines.

In an embodiment of the disclosure, each of the plurality of first reading signal lines extends along a first direction, each of the plurality of control signal lines extends along a second direction, and the first direction intersects the second direction. For example, the first direction and the second direction are substantially perpendicular to each other. In some embodiments, each of the plurality of second reading signal lines extends along the second direction.

In an embodiment of the disclosure, the touch panel further includes a touch sensing circuit. The touch sensing circuit provides a control signal to the plurality of control signal lines, and reads sensing signals of the plurality of first reading signal lines and the plurality of second reading signal lines.

In an embodiment of the disclosure, the number of the plurality of second reading signal lines is less than the number of the plurality of control signal lines.

In an embodiment of the disclosure, the plurality of second reading signal lines and the plurality of control signal lines are located between the substrate and the display panel.

Based on the foregoing, in the touch panel f an embodiment of the disclosure, the reading signal lines are disposed on both sides of the substrate to distinguish sensing signals from different sides. In this way, the touch panel of an embodiment of the disclosure can eliminate noise and improve sensing correctness. In addition, in an embodiment of the disclosure, when the touch panel is used with the display panel to form an electronic device, the touch panel may regard the sensing signal from the display panel as noise and filter the noise. As a result, the electronic device of an embodiment of the disclosure may achieve favorable touch sensing.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
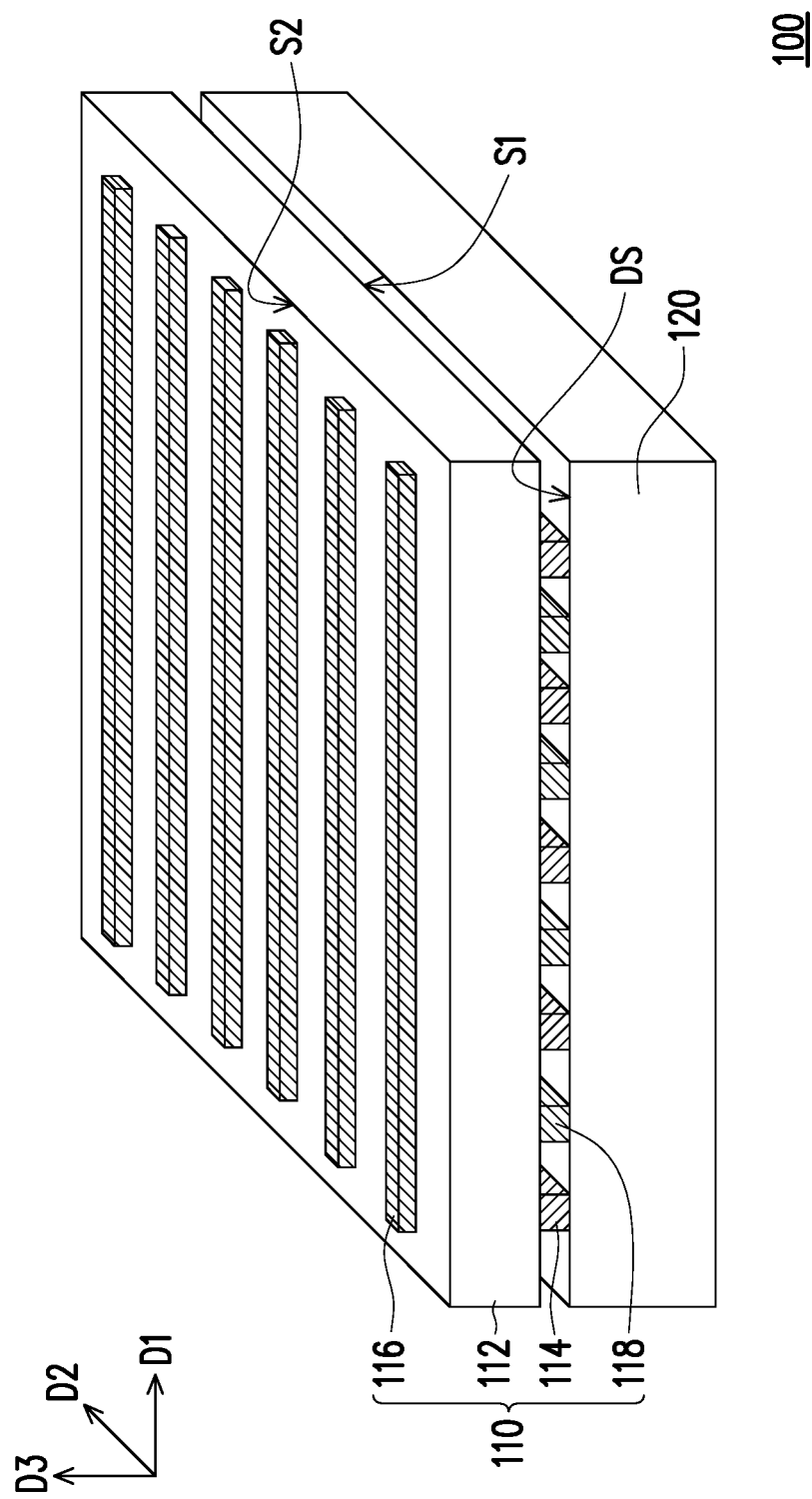
FIG. 1 is a schematic view of an electronic device of an embodiment of the disclosure.

FIG. 1 is a schematic view of an electronic device of an embodiment of the disclosure. In FIG. 1, an electronic device 100 includes a touch panel 110 and a display panel 120. The display panel 120 is disposed on one side of the touch panel 110 to emit or reflect display light toward the touch panel 110. In other words, the display panel 120 has a display surface DS, and the touch panel 110 is located above the display surface DS. In some embodiments, the touch panel 110 is a capacitive touch panel with double-layer electrodes, for example but not limited thereto. In some embodiments, the display panel 120 is an electronic paper panel, for example but not limited thereto. It should be understood that, in addition to the members shown in FIG. 1, the electronic device 100 may also include other members, such as an adhesive layer, a protective layer, and a casing. For clarity in description, FIG. 1 only shows some members of the electronic device 100.

Specifically, the touch panel 110 includes a substrate 112, a plurality of control signal lines 114, a plurality of first reading signal lines 116, and a plurality of second reading signal lines 118. The substrate 112 is a plate-shaped member extending on a plane formed substantially along a first direction D1 and a second direction D2. The substrate 112 has a first surface S1 and a second surface S2. The first surface S1 is opposite to the second surface S2. The control signal lines 114 are disposed on the first surface S1 of the substrate 112 and spaced from each other, the first reading signal lines 116 are disposed on the second surface S2 of the substrate 112 and spaced from each other, and the second reading signal lines 118 are disposed on the first surface S1 of the substrate 112. In other words, the control signal lines 114 and the second reading signal lines 118 are disposed between the substrate 112 and the display panel 120. In addition, each of the plurality of second reading signal lines 118 is located between adjacent two of the plurality of control signal lines 114. The control signal lines 114 and the second reading signal lines 118 are manufactured with the same conductive layer, for example. Nonetheless, depending on the functions of individual lines, the control signal line 114 is filled with an upper left-lower slash in the figure, and the second reading signal line 118 is filled with an upper right-lower slash. In other words, the control signal line 114 and the second reading signal line 118 are independent in terms of signals.

The material of the substrate 112 may include glass, plastic, and the like. For example, the substrate 112 is a light-transmitting substrate to allow the light of the display panel 120 to pass through. In FIG. 1, a third direction D3 may be the thickness direction of the substrate 112, and the touch panel 110 and the display panel 120 are overlapped in the third direction D3. In some embodiments, the touch panel 110 may be attached to the display panel 120 through an adhesive layer (not shown), and the adhesive layer may be a glue material in a square shape or a glue material filling the gap between the touch panel 110 and the display panel 120.

As shown in FIG. 1, the plurality of control signal lines 114, the plurality of first reading signal lines 116, and the plurality of second reading signal lines 118 are respectively strip-shaped signal lines. In some embodiments, the plurality of control signal lines 114, the plurality of first reading signal lines 116, and the plurality of second reading signal lines 118 may be manufactured with transparent conductive materials. Alternatively, the plurality of control signal lines 114, the plurality of first reading signal lines 116, and the plurality of second reading signal lines 118 may be manufactured with metal materials with the line widths being set to a width unlikely to be perceived by human eyes. In this way, the plurality of control signal lines 114, the plurality of first reading signal lines 116, and the plurality of second reading signal lines 118 may allow the display light presented by the display panel 120 to pass through and be viewed by users. The widths of the plurality of control signal lines 114, the plurality of first reading signal lines 116, and the plurality of second reading signal lines 118 shown in FIG. 1 are exemplarily illustrative, and are not intended to limit the actual line widths of these signal lines. In some embodiments, the plurality of control signal lines 114, the plurality of first reading signal lines 116, and the plurality of second reading signal lines 118 may individually be a straight, wavy, meandering, or curved signal line or a signal line in other forms. In some embodiments, the respective line widths of the plurality of control signal lines 114, the plurality of first reading signal lines 116, and the plurality of second reading signal lines 118 may be fixed or variable. Nonetheless, the plurality of control signal lines 114, the plurality of first reading signal lines 116, and the plurality of second reading signal lines 118 may each extend along a specified direction and serve as a linear member.

For example, each of the plurality of first reading signal lines 116 extends along the first direction D1, each of the plurality of control signal lines 114 extends along the second direction D2, and the first direction D1 intersects the second direction D2. In addition, each of the plurality of second reading signal lines 118 also extends along the second direction D2. In some embodiments, the first direction D1 and the second direction D2 may be substantially perpendicular to each other, but not limited thereto. Structurally, the plurality of control signal lines 114, the plurality of first reading signal lines 116, and the plurality of second reading signal lines 118 are members with conductive properties and for transmitting electrical signals. In terms of the function of electrical signals, the plurality of control signal lines 114 are configured to transmit control signals, and the plurality of first reading signal lines 116 and the plurality of second reading signal lines 118 are configured to transmit sensing signals.

In this embodiment, since the first reading signal lines 116 and the plurality of second reading signal lines 118 are located on opposite sides of the substrate 112, the sensing signals read by the first reading signal lines 116 and the plurality of second reading signal lines 118 may reflect different events. For example, the first reading signal lines 116 are disposed on the side relatively close to users. When user touch the touch panel 110, the first reading signal lines 116 may generate an apparent sensing signal. Comparatively, the second reading signal lines 118 are disposed on the side relatively close to the display panel 120, and the signal change inside the display panel 120 cause the second reading signal lines 118 to generate an apparent sensing signal. In this way, the touch panel 100 may determine the source of the sensing signal according to whether the sensing signal is read from the first reading signal lines 116 or the second reading signal lines 118. The touch panel 100 may identify the sensing signal read by the second reading signal lines 118 as noise, and correctly analyze the sensing signal of the actual touch action according to the received noise to achieve proper touch sensing correctness.

Each of the plurality of second reading signal lines 118 is located between adjacent two of the plurality of control signal lines 114. In other words, the second reading signal line 118 and the control signal line 114 may be disposed alternately, but not limited thereto. In some embodiments, the sensing signal read by the second reading signal lines 118 is used to distinguish noise, so it is not necessary to dispose a dense number of second reading signal lines 118. For example, the number of second reading signal lines 118 may be less than the number of control signal lines 114. As a result, the control signal lines 114 and the second reading signal lines 118 are not necessarily arranged alternately. For example, in some embodiments, several control signal lines 114 may be arranged consecutively without a second reading signal line 118 interposed in between.

Figure 2:
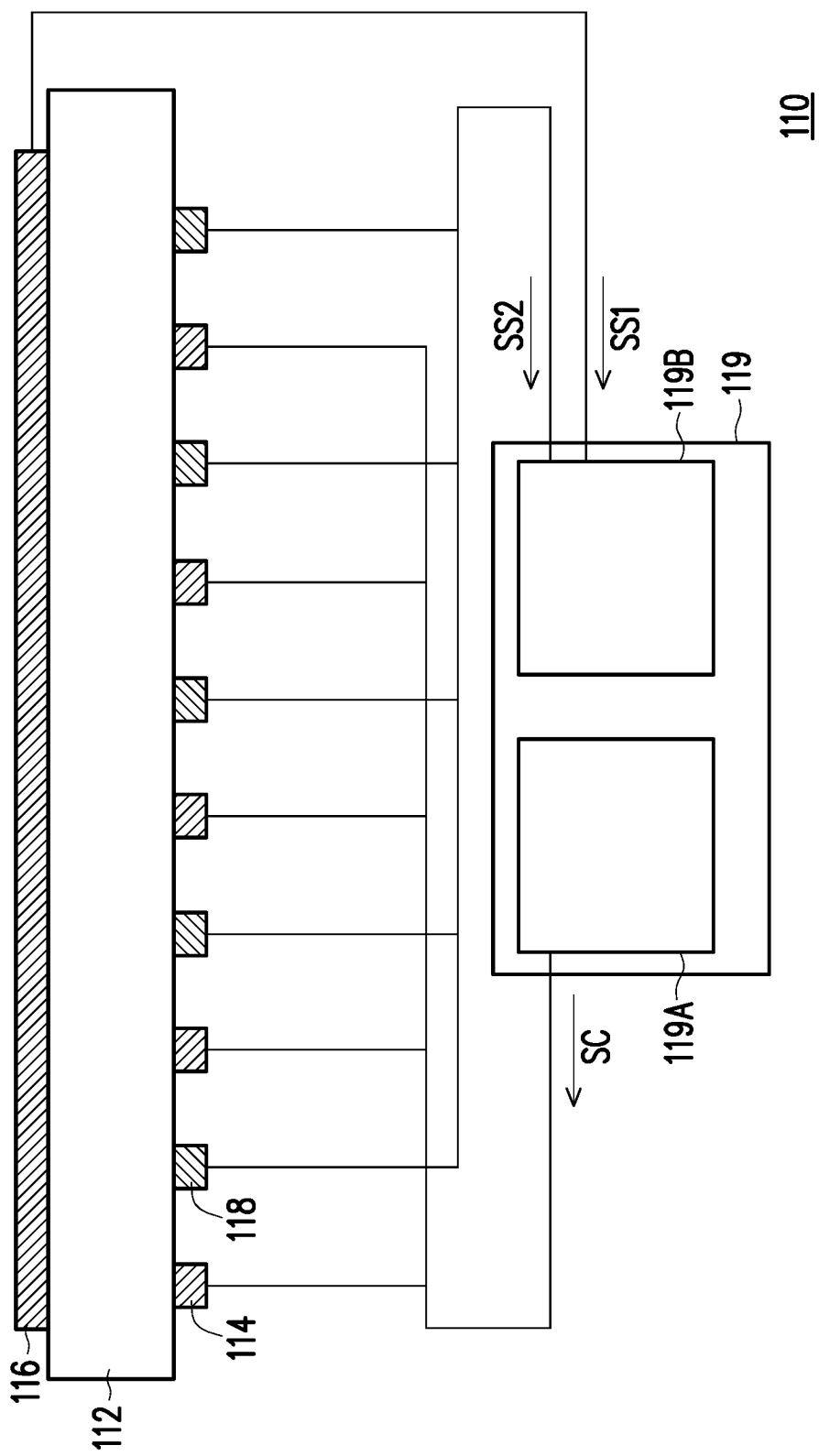
FIG. 2 is a schematic view of a touch panel of an embodiment of the disclosure.

FIG. 2 is a schematic view of a touch panel of an embodiment of the disclosure. The touch panel 110 of FIG. 2 includes the substrate 112, the plurality of control signal lines 114, the plurality of first reading signal lines 116, and the plurality of second reading signal lines 118 described above, and additionally includes a touch sensing circuit 119. The touch sensing circuit 119 provides a control signal SC to the plurality of control signal lines 114, and reads sensing signals (SS1 and SS2) of the plurality of first reading signal lines 116 and the plurality of second reading signal lines 118. Specifically, the touch sensing circuit 119 may include a control unit 119A and a reading unit 119B. The control unit 119A may be configured to provide the control signal SC to the plurality of control signal lines 114, and the reading unit 119B may read the sensing signal SS1 of the plurality of first reading signal lines 116 and the sensing signal SS2 of the plurality of second reading signal lines 118.

When the touch panel 110 is disposed on the display panel 120 in the manner shown in FIG. 1, the sensing signal SS2 of the plurality of second reading signal lines 118 mainly reflects signal disturbance from the display panel 120. As a result, when the reading unit 119B reads the sensing signal SS2 of the second reading signal lines 118, the reading unit 119B may determine the sensing signal SS2 to be noise. In this way, the touch panel 110 may distinguish noise from the real touch sensing signal and help improve sensing correctness of the touch panel 110.

In summary of the foregoing, in the touch panel and the electronic device of an embodiment of the disclosure, the reading signal lines are disposed on both sides of the substrate such that the sensing signals incurred by environments on different sides of the touch panel can be distinguished. In an embodiment of the disclosure, the touch panel and the electronic device can distinguish whether the sensing signal is a real signal or noise and achieve proper sensing correctness.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch panel comprising:
   a substrate;
   a plurality of control signal lines disposed on a first surface of the substrate and spaced from each other;
   a plurality of first reading signal lines disposed on a second surface of the substrate and spaced from each other, the second surface opposite to the first surface;
   a plurality of second reading signal lines disposed on the first surface of the substrate, each of the plurality of second reading signal lines located between adjacent two of the plurality of control signal lines; and
   a touch sensing circuit, wherein the touch sensing circuit provides a control signal to the plurality of control signal lines, and reads sensing signals of the plurality of first reading signal lines and the plurality of second reading signal lines.

2. The touch panel according to claim 1, wherein each of the plurality of first reading signal lines extends along a first direction, each of the plurality of control signal lines extends along a second direction, and the first direction intersects the second direction.

3. The touch panel according to claim 2, wherein the first direction and the second direction are substantially perpendicular to each other.

4. The touch panel according to claim 2, wherein each of the plurality of second reading signal lines extends along the second direction.

5. The touch panel according to claim 1, wherein the number of the plurality of second reading signal lines is less than the number of the plurality of control signal lines.

6. An electronic device comprising:
   a touch panel comprising:
      a substrate;
      a plurality of control signal lines disposed on a first surface of the substrate and spaced from each other;
      a plurality of first reading signal lines disposed on a second surface of the substrate and spaced from each other, the second surface opposite to the first surface; and
      a plurality of second reading signal lines disposed on the first surface of the substrate, each of the plurality of second reading signal lines located between adjacent two of the plurality of control signal lines; and
   a display panel disposed on one side of the touch panel,
   wherein the touch panel further comprises a touch sensing circuit, wherein the touch sensing circuit provides a control signal to the plurality of control signal lines, and reads sensing signals of the plurality of first reading signal lines and the plurality of second reading signal lines.

7. The electronic device according to claim 6, wherein the plurality of second reading signal lines and the plurality of control signal lines are located between the substrate and the display panel.

8. The electronic device according to claim 6, wherein each of the plurality of first reading signal lines extends along a first direction, each of the plurality of control signal lines extends along a second direction, and the first direction intersects the second direction.

9. The electronic device according to claim 8, wherein each of the plurality of second reading signal lines extends along the second direction.

10. The electronic device according to claim 8, wherein the first direction and the second direction are substantially perpendicular to each other.

11. The electronic device according to claim 6, wherein the number of the plurality of second reading signal lines is less than the number of the plurality of control signal lines.

* * * * *